US012589312B2

(12) United States Patent
Latifi et al.

(10) Patent No.: US 12,589,312 B2
(45) Date of Patent: Mar. 31, 2026

(54) ENDLESS GAME WITH NOVEL STORYLINE

(71) Applicant: IGT, Las Vegas, NV (US)

(72) Inventors: Soheil Latifi, Moncton (CA); David Froy, Lakeville-Westmorland (CA); Sven Aurich, Schwanberg (AT); Stefan Keilwert, St. Josef (AT)

(73) Assignee: IGT, Las Vegas, NV (US)

( * ) Notice: Subject to any disclaimer, the term of this patent is extended or adjusted under 35 U.S.C. 154(b) by 346 days.

(21) Appl. No.: 17/940,321

(22) Filed: Sep. 8, 2022

(65) Prior Publication Data

US 2024/0082735 A1      Mar. 14, 2024

(51) Int. Cl.
*A63F 13/00* (2014.01)
*A63F 13/69* (2014.01)

(52) U.S. Cl.
CPC .................................... *A63F 13/69* (2014.09)

(58) Field of Classification Search
CPC ........ A63F 13/45; A63F 13/822; A63F 13/79; A63F 13/55
See application file for complete search history.

(56) References Cited

U.S. PATENT DOCUMENTS

| | | |
|---|---|---|
| 8,147,334 B2 | 4/2012 | Gatto et al. |
| 8,764,566 B2 | 7/2014 | Miltenberger et al. |
| 10,205,998 B2 * | 2/2019 | Ullman .............. H04N 21/8547 |
| 10,991,202 B2 | 4/2021 | Oberberger et al. |
| 2003/0069057 A1 | 4/2003 | Defreees-Parrott |
| 2007/0087798 A1 | 4/2007 | McGucken |

| | | | |
|---|---|---|---|
| 2012/0069131 A1 * | 3/2012 | Abelow | ............. G06Q 30/0601 |
| | | | 345/589 |
| 2012/0190446 A1 | 7/2012 | Rogers | |
| 2016/0266740 A1 * | 9/2016 | Glasgow | ................. G06F 16/71 |

OTHER PUBLICATIONS

Crusader Kings 3 https://youtu.be/TLYY6h7p9S4?si=JC8eOo2m0W9gj0RC (Year: 2024).*
"AI Dungeon 2," Oasis Tech. 2019, 2 pages [retrieved online Dec. 14, 2022 from: aidungeon.cc/].
"How Artificial Intelligence (AI) Upends Game Development," Pexelplex, Nov. 1, 2021, 26 pages [retrieved online Dec. 14, 2022 from: pixelplex.io/blog/how-ai-enhances-game-development/].
Freeman "Can We Use Machine Learning to Generate Text Adventure Stories?" Towards Data Science, Aug. 6, 2019, 20 pages [retrieved online Dec. 14, 2022 from: towardsdatascience.com/can-we-use-machine-learning-to-generate-text-adventure-stories-f44dcc8171b8].

* cited by examiner

*Primary Examiner* — David L Lewis
*Assistant Examiner* — Eric M Thomas
(74) *Attorney, Agent, or Firm* — Sheridan Ross P.C.

(57) ABSTRACT

Embodiments of the present disclosure will be described in connection with an electronic game such as slots, video poker, or other such game. The game can provide a unique, dynamic storyline. For example, a storyline can be presented through graphical or other visual indicators that appear during game play, e.g. symbols or other game elements. The storyline and the graphical or other visual indicators of the storyline can change throughout a gaming session based on results in the game. For example, a winning spin in a slots game can cause the storyline to change in a positive direction while a non-winning spin can cause the storyline to remain neutral or change in a negative direct. Other factors that could influence the storyline can include, but are not limited to, the amount of a wager, the number of spins or the amount of time played so far, etc.

20 Claims, 7 Drawing Sheets

ENDLESS GAME WITH NOVEL STORYLINE

BACKGROUND

The present disclosure is generally directed to electronic games, in particular, toward an electronic game that can provide a unique, dynamic storyline.

Slot games and VLT games might differ from each other in terms of design, theme, and visual effects. But the main goal of these games is to place wagers and get an outcome. To entice players, these games can be design with particular themes in which elements of the game such as symbols on slot reels match the theme. However, such games become old and repetitive after a while. Therefore, the games have to be changed and redesigned from time to time to keep the business going and players entertained. This represents a significant investment in time and resources for game manufacturers. Hence, there is a need for a way to keep games fresh and entertaining for a longer period of time.

BRIEF SUMMARY

In certain embodiments, the present disclosure relates to an electronic gaming machine and games such as slots, video poker, or other such game that can provide a unique, dynamic storyline. According to one embodiment, a gaming system can comprise a processor and a memory coupled with and readable by the processor. The memory can store therein a set of instructions which, when executed by the processor, causes the processor to detect initiation of an electronic gaming session on the gaming system and accessing a model defining a plurality of narrative story elements. The model can be trained on a corpus of text documents comprising narrative stories, for example, using a generative recurrent neural network. An initial narrative for the electronic gaming session can be obtained based on the plurality of narrative story elements defined in the model. The initial narrative can be unique to the electronic gaming session. Obtaining the initial narrative comprises obtaining a text-based description of a story for the electronic gaming session. Content for the electronic gaming session can be generated based on the initial narrative. Generating the content for the electronic gaming session can comprise, for example, generating a graphical representation of the story based on the text-based description of the story. The generated content for the electronic gaming session can then be presented in a user interface for the gaming system.

The instructions can further cause the processor to monitor game status information for the electronic gaming session and obtain an updated narrative based on the model, the initial narrative, and the game status information for the electronic gaming session. For example, the game status information for the electronic gaming session can indicate a winning result in the electronic gaming session and the obtained updated narrative can be reflective of the winning result. In another example, the game status information for the electronic gaming session can indicate a non-winning result in the electronic gaming session and wherein the obtained updated narrative can be reflective of the non-winning result. In either case, updated content can be generated for the electronic gaming session based on the generated updated narrative and the generated updated content for the electronic gaming session can be presented in the user interface for the gaming system.

According to another embodiment, a game narrative modeling system can comprise a processor and a memory coupled with and readable by the processor. The memory can store therein a set of instructions which when executed by the processor causes the processor to train and maintain a model defining a plurality of narrative story elements on a corpus of text documents comprising narrative stories. For example, the model can be trained using a generative recurrent neural network. The instructions can further cause the processor to receive, from a game gaming system, an indication of initiation of an electronic gaming session on the gaming system, generate an initial narrative for the electronic gaming session based on the model, wherein the initial narrative for the electronic gaming session is unique to the electronic gaming session, and provide to the gaming system the generated initial narrative for the electronic gaming system.

The instructions can further cause the processor to receive game status information for the electronic gaming session from the gaming system, generate an updated narrative for the electronic gaming session based on the received game status information, and provide the generated updated narrative for the electronic game to the gaming system. For example, the received game status information can indicate a result in the electronic gaming session and the generated updated narrative for the electronic gaming session can be reflective of the result.

According to another embodiment, a method for presenting content in a gaming session can comprise detecting initiation of an electronic gaming session on the gaming system and accessing a model defining a plurality of narrative story elements. The model can be trained on a corpus of text documents comprising narrative stories, for example, using a generative recurrent neural network. An initial narrative for the electronic gaming session can be obtained based on the plurality of narrative story elements defined in the model. The initial narrative can be unique to the electronic gaming session and can comprise a text-based description of a story for the electronic gaming session. In some cases, the model can be maintained by a game narrative modeling system and obtaining the initial narrative for the gaming session can comprise receiving the initial narrative from the narrative modeling system. In other cases, the model can be maintained by the gaming system and obtaining the initial narrative for the gaming session can comprise generating the initial narrative. In either case, content for the electronic gaming session can be generated based on the obtained initial narrative. Generating the content for the electronic gaming session can comprise generating a graphical representation of the story based on the text-based description of the story. The generated content for the electronic gaming session can be presented in a user interface for the gaming system.

Game status information for the electronic gaming session can be monitored and an updated narrative can be obtained based on the model, the initial narrative, and the game status information for the electronic gaming session. Updated content for the electronic gaming session can then be generated based on the generated updated narrative and the generated updated content for the electronic gaming session can be presented in the user interface for the gaming system. In some cases, the updated narrative can be saved in response to a request from a player of the electronic gaming session.

Additional features and advantages are described herein and will be apparent from the following Description and the figures.

DETAILED DESCRIPTION

Embodiments of the present disclosure will be described in connection with an electronic game such as slots, video poker, or other such game. The game can provide a unique, dynamic storyline. For example, a storyline can be presented through graphical or other visual indicators that appear during game play, e.g. symbols or other game elements. The storyline and the graphical or other visual indicators of the storyline can change throughout a gaming session based on results in the game. For example, a winning spin in a slots game can cause the storyline to change in a positive direction while a non-winning spin can cause the storyline to remain neutral or change in a negative direct. Other factors that could influence the storyline can include, but are not limited to, the amount of a wager, the number of spins or the amount of time played so far, etc. In this way, the game can have a longer lifespan as it will take a significantly longer time for players to get used to them and find them boring. The games will be more exciting and encouraging this will cause more revenue. Additionally, since the games can have longer lifespan, game manufacturer can reduce time and resources on game development.

Figure 1:
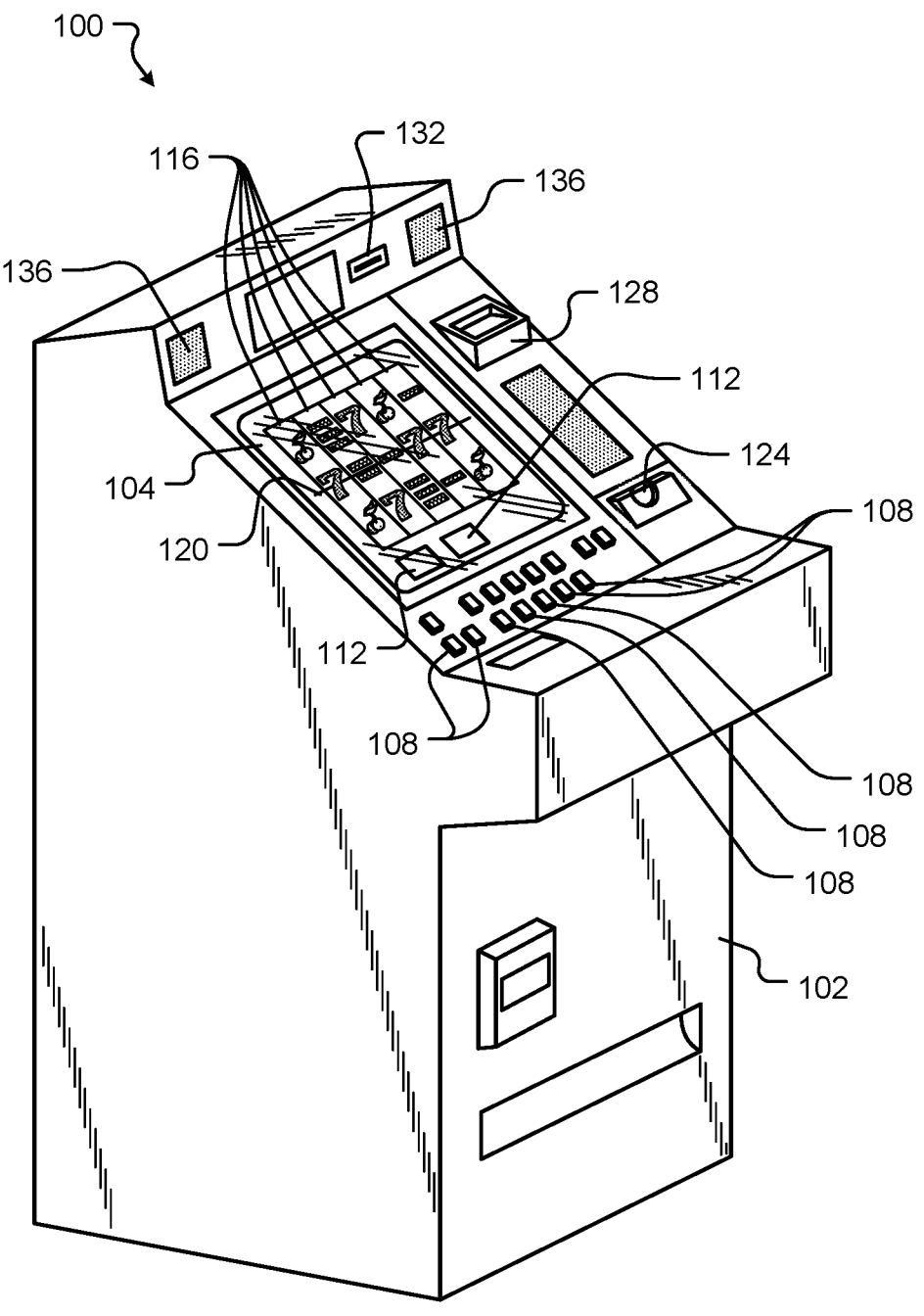
FIG. 1 is a diagram illustrating an exemplary gaming system in which embodiments of the present disclosure may be implemented.

FIG. 1 is a diagram illustrating an exemplary gaming system in which embodiments of the present disclosure may be implemented. More specifically, FIG. 1 illustrates a gaming system 100 that may be used to implement a hold and re-spin game or the like in which a game storyline may be implemented. A gaming system 100 may include a portable or non-portable device used for executing a gaming application or multiple different gaming applications without departing from the scope of the present disclosure. Non-limiting examples of a gaming system can include, but are not limited to, an EGM, a Video Gaming Machine (VGM), a mobile communication device (e.g., a smartphone, laptop, tablet, wearable device, etc.), a personal computer (PC), etc. An EGM or VGM-type of gaming system 100 is shown in FIG. 1 in accordance with embodiments of the present disclosure.

The illustrative gaming system 100 of FIG. 1 is shown to include a support structure, housing or cabinet 102 which provides support for a plurality of displays, inputs, controls and other features of a conventional gaming machine. In the illustrated embodiment, a player can play the gaming system 100 while sitting. However, the gaming system 100 can be alternatively configured so that a player can operate it while standing or sitting. The illustrated gaming system 100 can be positioned on the floor but can be positioned alternatively (i) on a base or stand, (ii) as a pub-style table-top game, (iii) as a stand-alone gaming system on the floor of a casino with other stand-alone gaming system, or (iv) in any other suitable manner. The gaming system 100 can be constructed with varying cabinet and display configurations.

In one embodiment, a gaming system 100 can be configured to randomly generate awards and/or other game outcomes based on probability data. Since a gaming system 100 can generate outcomes randomly or based upon a probability calculation, there is no certainty that the gaming system 100 will provide the player with any specific award or other game outcome.

In some embodiments, a gaming system 100 may employ a predetermined or finite set or pool of awards, progressive awards, prizes or other game outcomes. In such an embodiment, as each award or other game outcome is provided to the player, the gaming system 100 removes the provided award or other game outcome from the predetermined set or pool. Once removed from the set or pool, the specific provided award or other game outcome cannot be provided to the player again. The gaming system 100 may provide players with some or all of the available awards or other game outcomes over the course of a play cycle and may or may not guarantee a designated number of actual wins and losses.

The gaming system 100 may include one or more displays 112. An illustrative display 112 may include a credit display that displays a player's current number of credits, cash, account balance or the equivalent. Another illustrative display 112 may include a bet display that displays a player's amount wagered.

The gaming system 100 is also shown to include at least one payment acceptor. Illustrative payment acceptors may include, without limitation, a coin slot 124, where the player inserts coins or tokens, and a ticket, note, or bill acceptor 128, where the player inserts a bar-coded ticket, note, or cash. In one embodiment, a player-tracking card, credit card, debit card, or data card reader/validator 132 is also provided for accepting any of those or other types of cards as a form of payment toward playing a game on the gaming system 100.

In one embodiment, a player inserts an identification card into card reader 132 of gaming system 100. The identification card can be a smart card having a programmed microchip or a magnetic strip coded with a player's identification, credit totals, and other relevant information. In one embodiment, money may be transferred to a credit meter of the gaming system 100 through an electronic fund transfer and card reader 132 using the player's credit, debit, or smart card. When a player funds the gaming system 100, a processor of the gaming system 100 may determine the amount of funds entered and the corresponding amount is shown on the credit or other suitable display 112 as described herein.

In one embodiment, after appropriate funding of gaming system 100, the player presses an input device 108 to initiate game play. The input devices 108 may include various types of buttons, levers, gesture inputs, cameras, etc., that enable a player to start any game play or sequence of events. In one embodiment, upon appropriate funding, gaming system 100 begins game play automatically. In another embodiment, the player may be required to actuate or activate one of the play buttons to initiate play of gaming system 100. Other non-limiting types of input devices 108 may include a "bet one" button, a "max bet" button, or any other type of button known to be included in an EGM, VGM, or the like. It should further be appreciated that the input devices 108 may correspond to a physical button, a virtual button on a touch-screen of a game, an input element on a Graphical User Interface (GUI), or a combination thereof. In other words, the input devices 108 do not need to correspond to a physical button. In some embodiments, the player places a bet by pushing a "bet one" button (e.g., betting an amount equal to one credit for the next play). The player may increase the player's wager by one credit each time the player pushes "bet one" button. When the player pushes the "bet one" button, the number of credits shown in the credit display decreases by one, and the number of credits shown in the bet display increases by one. A "max bet" button can also be provided, which enables the player to bet the maximum wager (e.g., max lines, max wager per line, and re-spin operation). The gaming system 100 may include other suitable wager buttons, such as a "repeat bet" button (e.g., repeating the bet made from the immediately last play of the gaming system 100 for the next play of the gaming system 100), one or more "select paylines" buttons, a "select re-spin operation" button, and one or more "select wager per payline" buttons.

Another type of input device 108 that may be provided on the gaming system 100 is a physical cash out button, a virtual cash out button, a selectable GUI element, or the like. The player presses a cash out button and cashes-out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The gaming system 100 may also include one or more display screens 104 and one or more sound generating devices 136. The combination of outputs provided on a display screen 104 and sound generating device 136 may contribute to the game play experience and, in some embodiments, may provide the player with information regarding a status of a game play event or sequence of events.

In one embodiment, the sound generating device 136 may include at least one speaker or other type of transducer for generating audible sounds, playing music, etc. In one embodiment, a gaming system 100 can provide dynamic sounds coupled with attractive multimedia images displayed on the display screen 104 to provide an audio-visual representation or to otherwise display full-motion video with sound to attract players to the gaming system 100. During idle periods, the gaming system 100 displays a sequence of audio and/or visual attraction messages to attract potential players to the gaming system 100.

In one embodiment, a base or primary game can include a slot game with one or more paylines 120. As will be discussed in further detail herein, the game provided by the gaming system 100 may support one or multiple paylines 120, which may extend across the display screen 104 vertically, horizontally, diagonally, at adjusted angles, etc. In some embodiments, such as for a slot game, a payline 120 intersects a plurality of reels 116, such as three to five reels. Each reel 116 may be used to display different sets of symbols in connection with game play activity provided by the gaming system 100. In some embodiments, each reel 116 may operate independent of all other reels and the symbols displayed by a reel 116 at the end of a given spin may depend upon random numbers generated by the gaming system 100. The positions of symbols on each reel 116 and in the combination of reels 116 may form the array of symbols distributed throughout an array of cells. The distribution of symbols may be presented in a presentation order rendered to the display screen 104 of the gaming system 100.

The reels 116 may be provided in video form with simulated reels being displayed via the display screen 104. A reel 116 may be used to display any number of symbols such as bells, hearts, fruits, numbers, letters, bars or other images and symbols, which could correspond to a theme associated with a game provided by the gaming system 100. The gaming system 100 may be configured to award prizes, awards, or other game play opportunities when the reels 116 stop spinning and a particular symbol combination is intersected by an active payline 120 (e.g., a payline 120 that is currently being wagered and is subject to evaluation for a win after the reels 116 have stopped spinning and a distribution of symbols is finalized).

Figure 2:
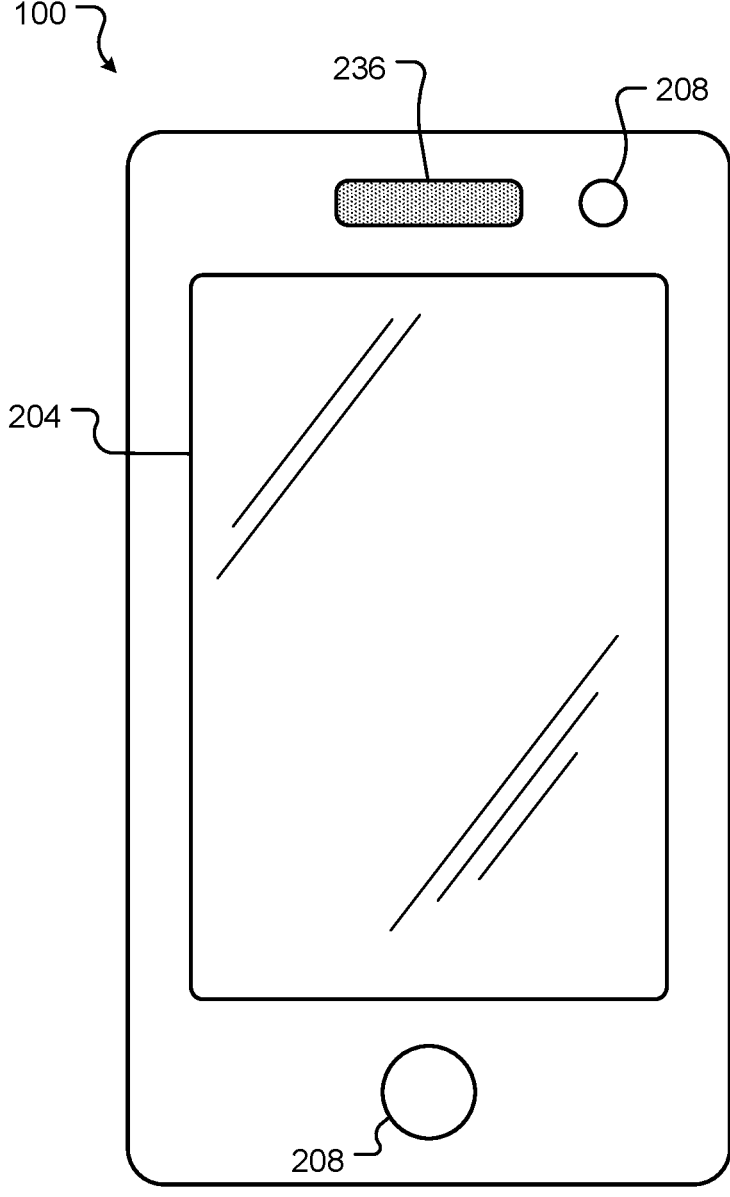
FIG. 2 is a diagram illustrating another exemplary gaming system in which embodiments of the present disclosure may be implemented.

FIG. 2 is a diagram illustrating another exemplary gaming system in which embodiments of the present disclosure may be implemented. As illustrated in this example, the gaming system 100 may be implemented by software executing on a portable gaming system 100 such as a mobile smartphone, tablet, wearable, etc. The gaming system 100 may be owned by a user of the device rather than being owned by a casino operator. In other embodiments, the portable gaming system 100 may be owned by a casino operator and provided to a player for an amount of time, possibly under an agreement between the casino operator and the player. As an example, the portable gaming system 100 may be assigned to the player for a duration of their visit or stay at the casino, but the portable gaming system 100 may be returned by the player back to the casino operator after the visit or stay has concluded.

The gaming system 100 includes a display screen 204, a plurality of input devices 208, and at least one speaker 236. In some embodiments, the display screen 204 may correspond to a touch-sensitive display screen, meaning that the display screen 204 is simultaneously capable of displaying information (e.g., in connection with game play activity) and receiving a user input. In some embodiments, the touch-sensitive display screen 204 may provide game features similar to a cabinet-style gaming system 100 without requiring all of the dedicated buttons provided by a cabinet-style gaming system 100.

As introduced above, the gaming system 100 can execute am electronic game such as slots, video poker, or other such game. Additionally, the gaming system 100 can provide a unique, dynamic storyline. For example, storyline can be presented through graphical or other visual indicators that appear during game play, e.g. symbols displayed on the reels 116 or other game elements. The storyline and the graphical or other visual indicators of the storyline can change throughout a gaming session based on results in the game. For example, a winning spin in a slots game can cause the storyline to change in a positive direction while a non-winning spin can cause the storyline to remain neutral or change in a negative direct. Other factors that could influence the storyline can include, but are not limited to, the amount of a wager, the number of spins or the amount of time played so far, etc.

Figure 3:
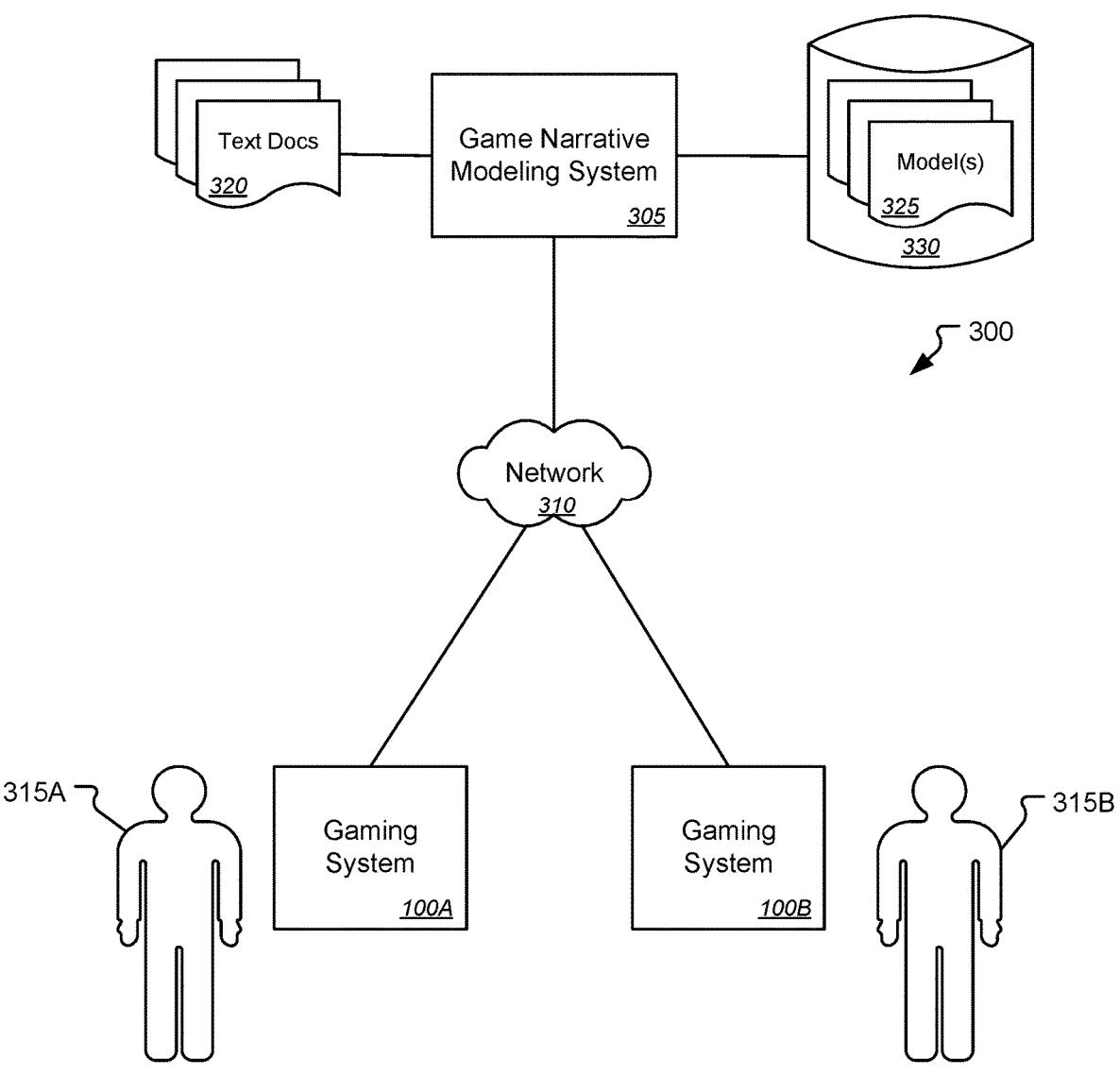
FIG. 3 is a block diagram illustrating elements of an exemplary environment in which embodiment of the present disclosure can be implemented.

FIG. 3 is a block diagram illustrating elements of an exemplary environment in which embodiment of the present disclosure can be implemented. As illustrated in this example, the environment 300 can include a number of gaming systems 100A-100B such as any of the gaming systems 100 described above. These gaming system 100A-100B can provide any number of different electronic games including but not limited to slots, video lottery, video poker, etc. Through the gaming systems 100A-100B, players 315A-315B can engage in electronic gaming sessions.

Embodiments of the present disclosure are directed to making these games more fun and objective oriented, by providing as part of the game a novel or unique storyline, i.e., the storyline presented by game elements is unique to each gaming session and evolves as the game is played. Each game based on the theme can have a new story every time a player starts playing. These stories are generated at playtime and the outcomes of the machine after each bet advances the story accordingly. The player no longer is motivated only by winning and losing but to go through the playtime generated story and enjoy a different form of fun. This approach provides the manufacturer of the gaming system 100A-100B with longer lasting games which are more engaging encouraging more and longer play, both of which contribute to higher revenues and profits for the manufacturer.

According, the gaming systems 100A-100B can be coupled with a communications network 310 including one or more wired and/or wireless local and/or wide area networks of various types. A game narrative modeling system 305 can also be coupled with the communications network 310. According to one embodiment, the game narrative modeling system 305 can implement or utilize a generative recurrent neural network trained on different corpus text documents 320 that have a story like element. This corpus of text document 320 can include a wide range of text documents from famous novels to crime news and epic folklore tales. Using this corpus of text documents 320, the game narrative modeling system 305 can train one or more models 325 defining story elements. These models 325 can then be saved in a repository 330 and used to generate storylines for gaming sessions conducted on the gaming systems 100A-100B. In other implementations, one or more models 325 may be downloaded to the gaming systems 100A-100B.

In either case, when a gaming session with a player 315A is initiated, a model 325 can be used to generate new text from what it has learned. From this text, the gaming machine 100A can select game elements that match the text. For example, if the generative model is about a gladiator or has an ancient roman theme, the gaming system 100A can chooses reel images that match the ancient roman theme.

Additional features implemented by the gaming systems 100A-100B can include, but are not limited to a save progress functionality or a function to request a new story within the games. There can also be other features such as purchasing cosmetics, accessories, tools, etc. for a character in the story from within the game related payment options. Adjustments to the storyline as the gaming session progresses can be made to highlight big wins or big loses. For example, a story can be generated as the player 315A starts playing in a gaming session. This initial storyline or narrative can be based on the outcome of the player's bets, i.e., a win or loss can produce either positive story turn or negative story turn. The gaming system 100A can then change the theme, add characters to the screen to match the story and visually chose the transitions that fit the situation the best. The rest of the gaming session can continue as the player places a bet, cashes-in encounters a bonus feature etc., and the model 325 can be used to produce a continuing narrative that can be reflected by the gaming system 100A in elements presented in the gamin session.

Figure 4:
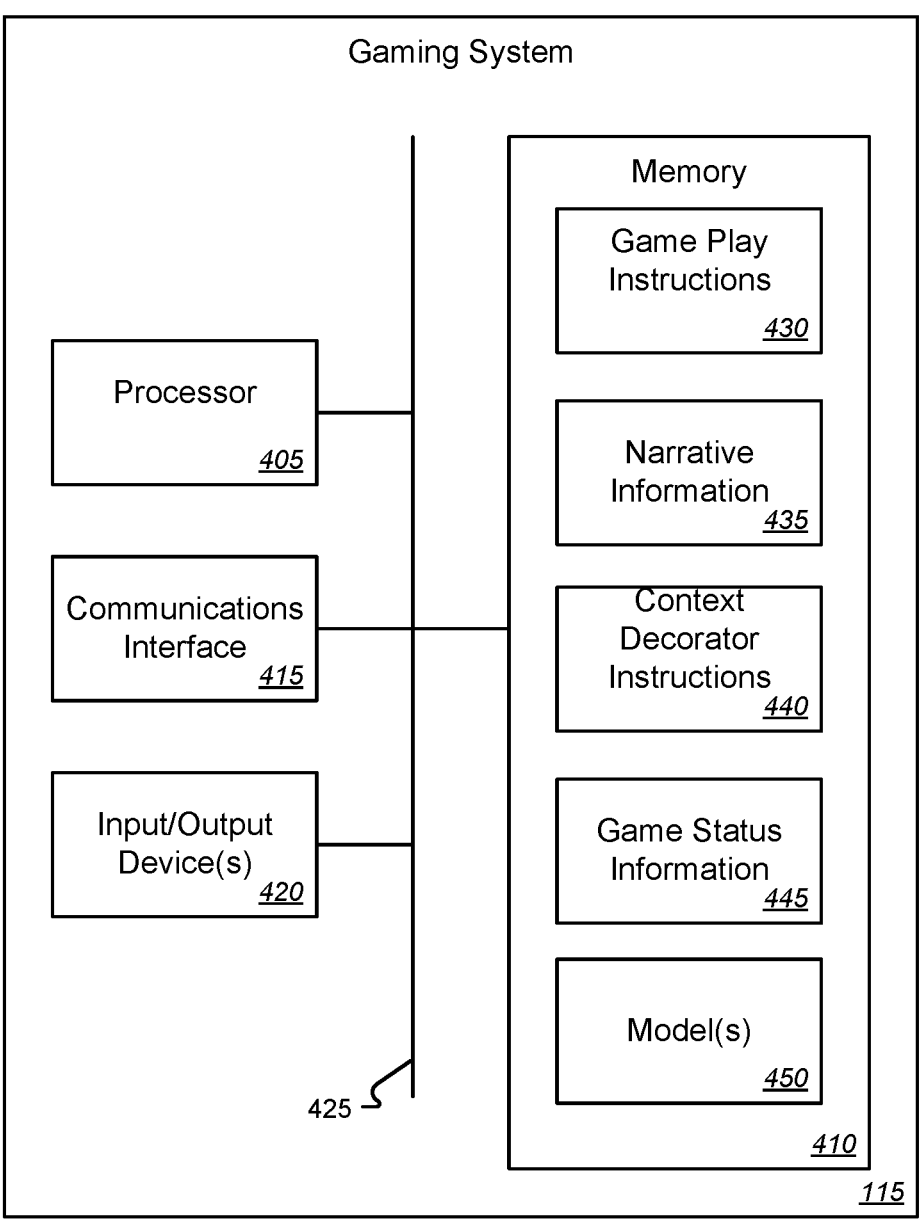
FIG. 4 is a block diagram illustrating additional details of an exemplary gaming system in which unique storylines can be implemented according to embodiments of the present disclosure.

FIG. 4 is a block diagram illustrating additional details of an exemplary gaming system in which unique storylines can be implemented according to embodiments of the present disclosure. As illustrated in this example, the gaming system 100 can comprise a processor 405. The processor 405 may correspond to one or many computer processing devices. For instance, the processor 405 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 405 may be provided as a microprocessor, Central Processing Unit (CPU), or plurality of microprocessors that are configured to execute the instructions sets stored in a memory 410. Upon executing the instruction sets stored in memory 410, the processor 405 enables various functions of the gaming system 100 as described herein.

The memory 410 can be coupled with and readable by the processor 405 via a communications bus 425. The memory 410 may include any type of computer memory device or collection of computer memory devices. Non-limiting examples of memory 410 include Random Access Memory (RAM), Read Only Memory (ROM), flash memory, Electronically-Erasable Programmable ROM (EEPROM), Dynamic RAM (DRAM), etc. The memory 410 may be configured to store the instruction sets depicted in addition to temporarily storing data for the processor 405 to execute various types of routines or functions.

The processor 405 can also be coupled with one or more communications interfaces 415 and one or more input/output devices 420 via the bus 425. The communication interfaces 415 can comprise, for example, Ethernet, Bluetooth, WiFi, or other type of wired or wireless communications interfaces. The input/output devices 420 can comprise, for example, a display such as a Liquid Crystal Display (LCD), Light Emitting Diode (LED), Organic Light Emitting Diode (OLED), display or other type of display for presenting images and other graphics and can be touch sensitive allowing the user to use the display 420 as an input device as well. Additionally, or alternatively, the input/output devices 420 can comprise any combination of reels, buttons, lights, and/or other input/output devices.

The memory 410 can store therein a set of game play instructions 430 which, when executed by the processor 405, causes the processor 405 to conduct a gaming session with a player 315. As noted above, the electronic gaming session can comprise any of a slots game, a video lottery, video poker, or other electronic game. The game play instructions 430 can cause the processor to detect initiation of an electronic gaming session on the gaming system 100. Initiation of the gaming session can be detected, for example, by a player 315 carding into the gaming system 100 or otherwise starting game play as known in the art.

The memory 410 can also have stored therein a set of game narrative instructions 435. When executed by the processor 405, the game narrative instructions 435 can cause the processor 405 to access a model defining a plurality of narrative story elements. The model can be trained on a corpus of text documents comprising narrative stories, for example, using a generative recurrent neural network. The game narrative instructions 435 can cause the processor 405 to obtain an initial narrative for the electronic gaming session based on the plurality of narrative story elements defined in the model. The initial narrative can be unique to the electronic gaming session. The narrative can comprise a text-based description of a unique story for the electronic gaming session based on the model. According to one embodiment, the model can be maintained by a game narrative modeling system 305. In such cases, accessing the model and obtaining the initial narrative for the gaming session comprise requesting and receiving the initial narrative from the game narrative modeling system 305 through the communications interface 415. According to another embodiment, the model 450 may be maintained, in whole or in part, in the memory 410 of the gaming system 100. For example, the model 450 may be trained by another system such as the game narrative modeling system 305 and downloaded to or otherwise transferred to the gaming system 100. In such cases, the game narrative instructions 435 can cause the processor 405 to obtain the initial narrative for the gaming session by generating the initial narrative based on the model 450.

The memory 410 can also have stored therein a set of context decorator instructions 440. When executed by the processor 405, the context decorator instructions 440 can cause the processor 405 to generate content for the electronic gaming session based on the initial narrative. Generating the content for the electronic gaming session can comprise, for example, generating a textual and/or graphical representation of the story based on the text-based description of the story. The context decorator instructions 440 can cause the processor 405 to present the generated content for the electronic gaming session in a user interface for the gaming system 100, e.g., through a display and/or other input/output device 420. For example, the generated content can comprise any one or more of a graphical representation of a character in the story presented on an interface of the gaming system 100, an animation of such a character or other elements presented on an interface of the gaming system 100, text displayed along with or instead of such graphical representations, audio played out by a speaker or other input/output device 420 of the gaming system 100, etc.

The game narrative instructions 435 can further cause the processor 405 to monitor game status information 445 for the electronic gaming session while the gaming session is being conducted and obtain an updated narrative based on the model, the initial narrative, and the game status information 445 for the electronic gaming session. For example, the game status information 445 for the electronic gaming session can indicate a winning result in the electronic gaming session and the obtained updated narrative can be reflective of the winning result, e.g., by a positive turn in the story. In another example, the game status information for the electronic gaming session can indicate a non-winning result in the electronic gaming session and the obtained updated narrative can be reflective of the non-winning result, e.g., by a negative turn in the story.

The game narrative instructions 435 can further cause the processor 405 to obtain an updated narrative whenever a result, either winning or non-winning, is detected in the electronic gaming session. Additionally, or alternatively, the game narrative instructions 435 can further cause the processor 405 to obtain the updated narrative upon a request by the player 315 in the electronic gaming session, e.g., to request a different story or make a change to the current story. In either case, obtaining the updated narrative can comprise requesting and receiving the updated narrative from the game narrative modeling system 305 or generating the updated narrative using the model 450 maintained in the memory 410 of the gaming system 100 depending upon the implementation.

The context decorator instructions 440 can cause the processor 405 to generate updated content for the electronic gaming session based on the updated narrative and present the generated updated content for the electronic gaming session in the user interface for the gaming system, e.g., through one or more input/output devices. According to one embodiment, the game narrative instructions 435 can further cause the processor 405 to save the updated narrative, e.g., for continuation in another, future gaming session conducted on the same or different gaming system 100 by the same player 315. Saving the updated narrative can be performed automatically or, in some cases, in response to a request from the player 315 of the electronic gaming session.

Figure 5:
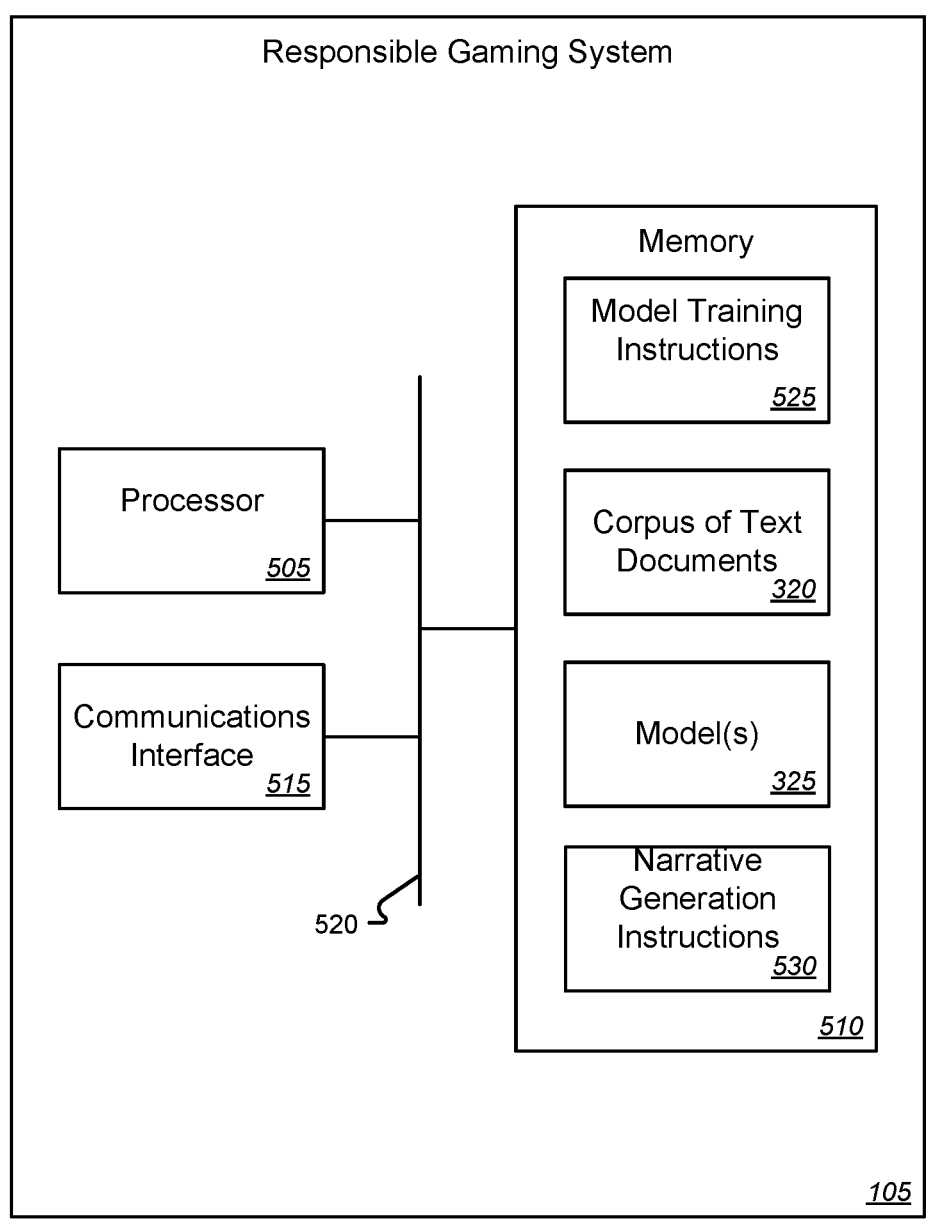
FIG. 5 is a block diagram illustrating additional details of an exemplary game narrative modeling system in which a narrative model can be maintained according to embodiments of the present disclosure.

FIG. 5 is a block diagram illustrating additional details of an exemplary game narrative modeling system in which a narrative model can be maintained according to embodiments of the present disclosure. As illustrated in this example, the game narrative modeling system 305 can comprise a processor 505 such as any of the various types of processors described above. A memory 510 can be coupled with and readable by the processor 505 via a communications bus 520. The memory 510 can comprise any one or more of the different types of volatile and/or non-volatile memories described above. The processor 505 can also be coupled with one or more communication interfaces 515 via the communications bus 520. The communication interfaces 515 can comprise, for example, Ethernet, Bluetooth, WiFi, or other type of wired or wireless communications interfaces.

The memory 510 can store therein a set of model training instructions 525 which, when executed by the processor 505, causes the processor 505 to train and maintain one or more models 325, each defining a plurality of narrative story elements. The model(s) 325 can be trained on a corpus of text documents 320 comprising narrative stories. For example, the model can be trained 705 using a generative recurrent neural network and maintained in a repository. Different models can, for example, each relate to different themes or genres, etc.

The memory 510 can also have stored therein a set of narrative generation instructions 530. When executed by the processor 505, the narrative generation instructions 530 can cause the processor 505 to receive, e.g., through the communications interface 515, from the game gaming system 100 an indication of initiation of an electronic gaming session on a gaming system 100. This indication can comprise, for example, a request for an initial narrative for the gaming session. The narrative generation instructions 530 can cause the processor 505 to generate the initial narrative for the electronic gaming session based on the model(s) 325. As noted, the initial narrative for the electronic gaming session can be unique to the electronic gaming session. The narrative generation instructions 530 can then cause the processor 505 to provide the generated initial narrative for the electronic gaming session to the gaming system 100, e.g., through the communications interface 515.

The narrative generation instructions 530 can cause the processor 505 to receive game status information for the electronic gaming session from the gaming system 100 through the communications interface 515 while the gaming session is being conducted. The narrative generation instructions 530 can cause the processor 505 to generate an updated narrative for the electronic gaming session based on the received game status information and provide the updated narrative to the gaming system 100 through the communications interface 515. For example, the received game status information can indicate a result in the electronic gaming session, e.g., a winning result or non-winning result, and the generated updated narrative for the electronic gaming session can be reflective of the result, e.g., a positive turn in the narrative or a negative turn in the narrative.

Figure 6:
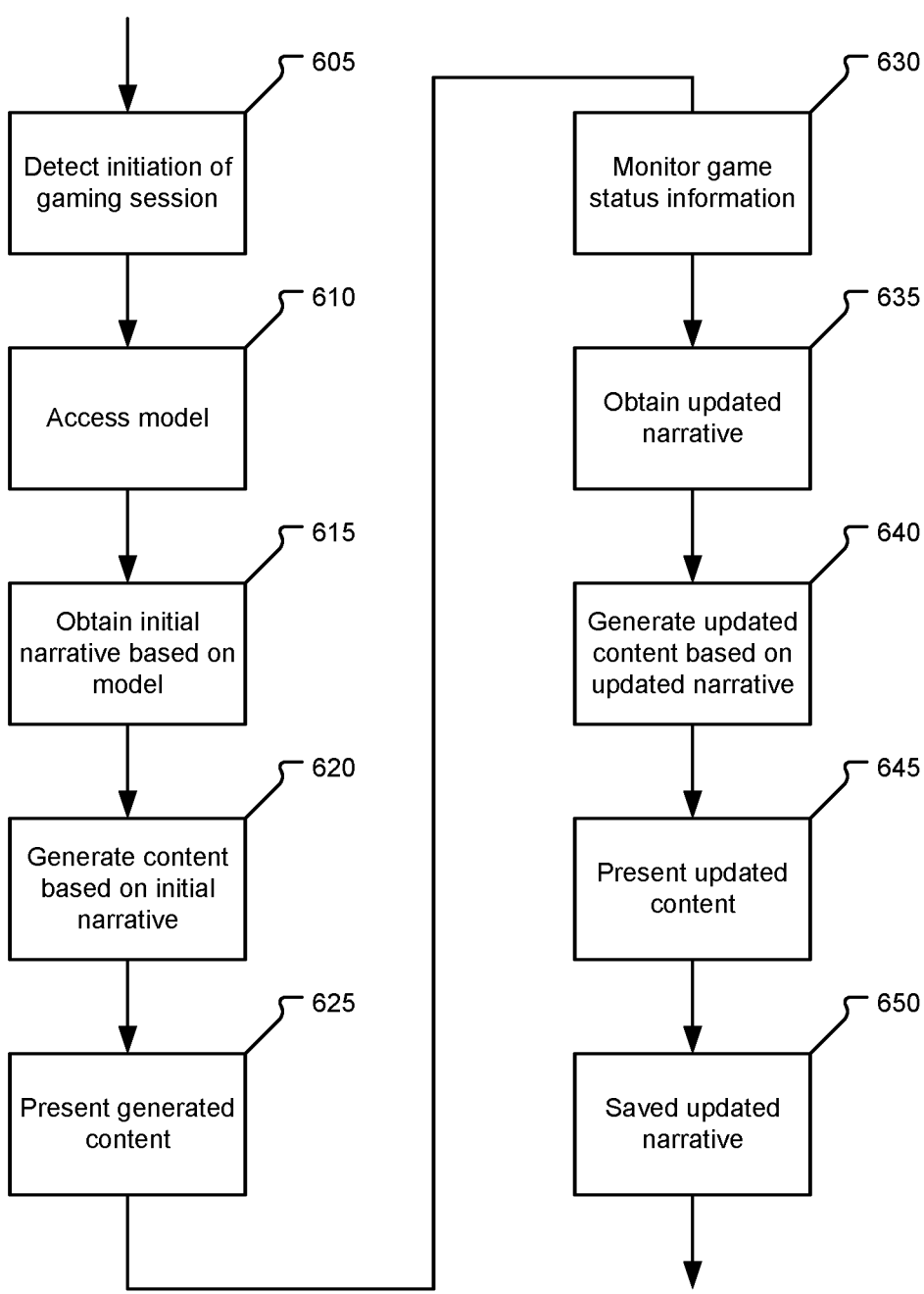
FIG. 6 is a flowchart illustrating an exemplary process for presenting a unique storyline in an electronic gaming session according to one embodiment of the present disclosure.

FIG. 6 is a flowchart illustrating an exemplary process for presenting a unique storyline in an electronic gaming session according to one embodiment of the present disclosure. As illustrated in this example, the process can begin with detecting 605 initiation of an electronic gaming session on the gaming system 100. Initiation of the gaming session can be detected, for example, by a player 315 carding into the gaming system 100 or otherwise starting game play as known in the art. As noted above, the electronic gaming session can comprise any of a slots game, a VLT, video poker, or other electronic game.

A model defining a plurality of narrative story elements can be accessed 610. The model can be trained on a corpus of text documents comprising narrative stories, for example, using a generative recurrent neural network. An initial narrative for the electronic gaming session can be obtained 615 based on the plurality of narrative story elements defined in the model. The initial narrative can be unique to the electronic gaming session. The narrative can comprise a text-based description of a unique story for the electronic gaming session based on the model. According to one embodiment, the model can be maintained by a game narrative modeling system 305. In such cases, accessing 610 the model and obtaining 615 the initial narrative for the gaming session comprise requesting and receiving the initial narrative from the narrative modeling system 305. According to another embodiment, the model may be maintained, in whole or in part, by the gaming system 100. In such cases, obtaining 615 the initial narrative for the gaming session can comprise generating the initial narrative based on the model.

Content for the electronic gaming session can be generated 620 based on the initial narrative. Generating 620 the content for the electronic gaming session can comprise, for example, generating a textual and/or graphical representation of the story based on the text-based description of the story. The generated 620 content for the electronic gaming session can then be presented 625 in a user interface for the gaming system. For example, the generated 620 content can comprise any one or more of a graphical representation of a character in the story presented on an interface of the gaming system 100, an animation of such a character or other elements presented on an interface of the gaming system 100, text displayed along with or instead of such graphical representations, audio played out by the gaming system 100, etc.

Game status information for the electronic gaming session can be monitored 630 while the gaming session is being conducted and an updated narrative can be obtained 635 based on the model, the initial narrative, and the game status information for the electronic gaming session. For example, the game status information for the electronic gaming session can indicate a winning result in the electronic gaming session and the obtained 635 updated narrative can be reflective of the winning result. In another example, the game status information for the electronic gaming session can indicate a non-winning result in the electronic gaming session and the obtained updated narrative can be reflective of the non-winning result.

According to one embodiment, the updated narrative can be obtained 635 whenever a result, either winning or non-winning, is detected in the electronic gaming session. Additionally, or alternatively, the updated narrative can be obtained 635 upon a request by the player 315 in the electronic gaming session, e.g., to request a different story or make a change to the current story. In either case, obtaining 635 the updated narrative can comprise requesting and receiving the updated narrative from the game narrative modeling system 305 or generating the updated narrative depending upon the implementation.

Updated content can be generated 640 for the electronic gaming session based on the updated narrative and the generated 640 updated content for the electronic gaming session can be presented 645 in the user interface for the gaming system. According to one embodiment, the updated narrative can be saved 650, e.g., for continuation in another, future gaming session conducted on the same or different gaming system 100 by the same player 315. Saving 650 the updated narrative can be performed automatically or, in some cases, in response to a request from the player 315 of the electronic gaming session.

Figure 7:
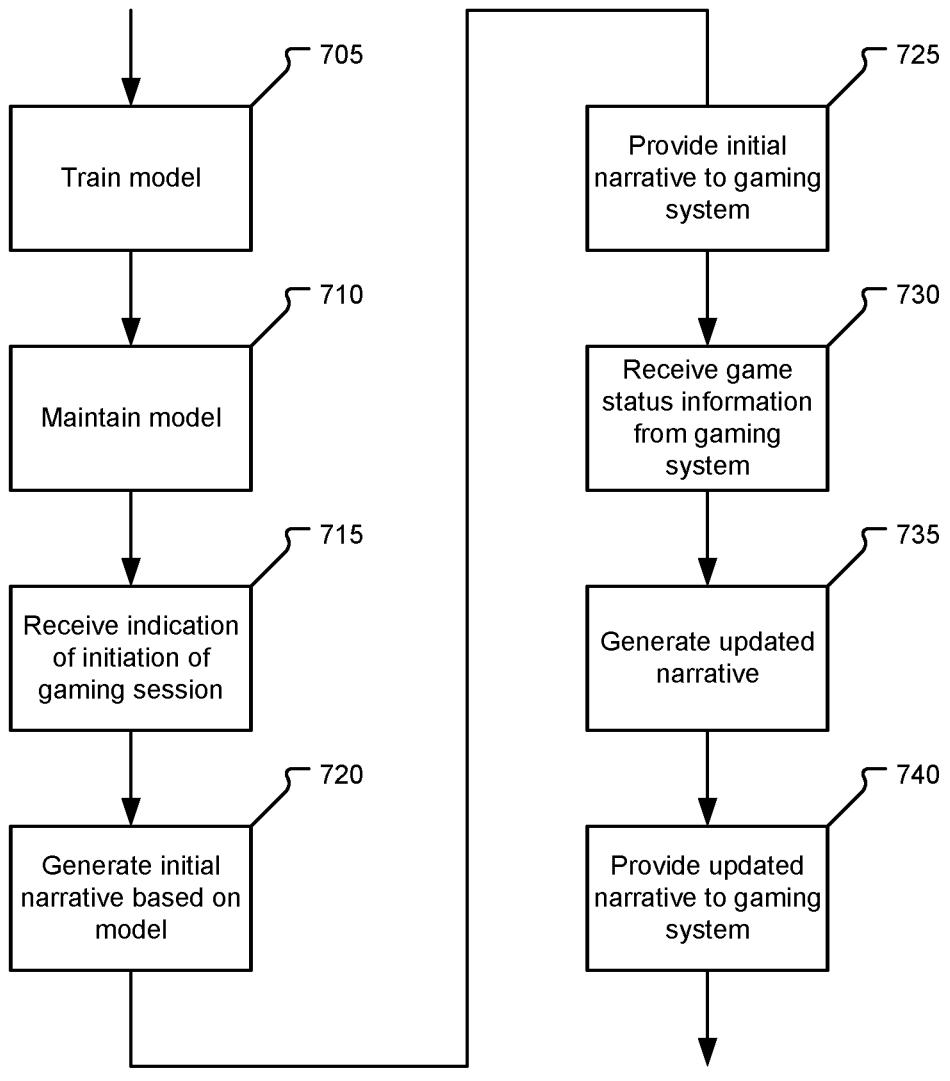
FIG. 7 is a flowchart illustrating an exemplary process for maintaining and utilizing a narrative model according to one embodiment of the present disclosure.

FIG. 7 is a flowchart illustrating an exemplary process for maintaining and utilizing a narrative model according to one embodiment of the present disclosure. As illustrated in this example, the process can begin with training 705 and maintaining 710 a model defining a plurality of narrative story elements on a corpus of text documents comprising narrative stories. For example, the model can be trained 705 using a generative recurrent neural network and maintained 710 in a repository, perhaps as one of a plurality of different models, e.g., each with different themes or genres, etc. An indication of initiation of an electronic gaming session on a gaming system 100 can be received 715 from the game gaming system 100. This indication can comprise, for example, a request for an initial narrative for the gaming session. The initial narrative for the electronic gaming session can then be generated 720 based on the model. As noted, the initial narrative for the electronic gaming session can be unique to the electronic gaming session. The generated initial narrative for the electronic gaming session can then be provided to the gaming system 100.

Game status information for the electronic gaming session can be received 730 from the gaming system 100 while the gaming session is being conducted. An updated narrative for the electronic gaming session can be generated 735 based on the received game status information, and provided 740 to the gaming system 100. For example, the received 730 game status information can indicate a result in the electronic gaming session, e.g., a winning result or non-winning result, and the generated 735 updated narrative for the electronic gaming session can be reflective of the result, e.g., a positive turn in the narrative or a negative turn in the narrative.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A gaming system comprising:
   a processor; and
   a memory coupled with and readable by the processor and storing therein a set of instructions which, when executed by the processor, causes the processor to:
   detect initiation of an electronic gaming session of a hold and re-spin game on the gaming system;
   access a model defining a plurality of narrative story elements;
   obtain an initial narrative for the electronic gaming session based on the plurality of narrative story elements defined in the model, wherein the initial narrative is unique to the electronic gaming session;
   generate content for the electronic gaming session based on the initial narrative, wherein the generated content comprises elements of the hold and re-spin game; and
   present the generated content for the electronic gaming session in a user interface for the gaming system.

2. The gaming system of claim 1, wherein the model is trained on a corpus of text documents comprising narrative stories using a generative recurrent neural network.

3. The gaming system of claim 1, wherein obtaining the initial narrative comprises obtaining a text-based description of a story for the electronic gaming session.

4. The gaming system of claim 3, wherein generating the content for the electronic gaming session comprises generating a graphical representation of the story based on the text-based description of the story.

5. The gaming system of claim 1, wherein the instructions further cause the processor to:
   monitor game status information for the electronic gaming session;
   obtain an updated narrative based on the model, the initial narrative, and the game status information for the electronic gaming session;
   generate updated content for the electronic gaming session based on the obtained updated narrative; and
   present the generated updated content for the electronic gaming session in the user interface for the gaming system.

6. The gaming system of claim 5, wherein the game status information for the electronic gaming session indicates a winning result in the electronic gaming session and wherein the obtained updated narrative is reflective of the winning result.

7. The gaming system of claim 5, wherein the game status information for the electronic gaming session indicates a non-winning result in the electronic gaming session and wherein the obtained updated narrative is reflective of the non-winning result.

8. A game narrative modeling system comprising:
   a processor; and
   a memory coupled with and readable by the processor and storing therein a set of instructions which when executed by the processor causes the processor to:

maintain a model defining a plurality of narrative story elements;

receive, from a game gaming system, an indication of initiation of an electronic gaming session of a hold and re-spin game on the gaming system;

generate an initial narrative for the electronic gaming session based on the model, wherein the initial narrative for the electronic gaming session is unique to the electronic gaming session, and wherein the generated content comprises elements of the hold and re-spin game; and provide to the gaming system the generated initial narrative for the electronic gaming system.

9. The game narrative modeling system of claim 8, wherein the instructions further cause the processor to:

receive game status information for the electronic gaming session from the gaming system;

generate an updated narrative for the electronic gaming session based on the received game status information; and provide the generated updated narrative for the electronic game to the gaming system.

10. The game narrative modeling system of claim 9, wherein the received game status information indicates a result in the electronic gaming session and wherein the generated updated narrative for the electronic gaming session is reflective of the result.

11. The game narrative modeling system of claim 8, wherein the instructions further cause the processor to train the model on a corpus of text documents comprising narrative stories.

12. The game narrative modeling system of claim 11, wherein the model is trained using a generative recurrent neural network.

13. A method for presenting content in a gaming session, the method comprising detecting, by the processor of the gaming system, initiation of an electronic gaming session of a hold and re-spin game on the gaming system;

accessing, by a processor of a gaming system, a model defining a plurality of narrative story elements;

obtaining, by the processor of the gaming system, an initial narrative for the electronic gaming session based on the plurality of narrative story elements defined in the model, wherein the initial narrative is unique to the electronic gaming session;

generating, by the processor of the gaming system, content for the electronic gaming session based on the initial narrative, wherein the generated content comprises elements of the hold and re-spin game; and presenting, by the processor of the gaming system, the generated content for the electronic gaming session in a user interface for the gaming system.

14. The method of claim 13, wherein the model is trained on a corpus of text documents comprising narrative stories using a generative recurrent neural network.

15. The method of claim 13, wherein the initial narrative comprises a text-based description of a story for the electronic gaming session.

16. The method of claim 15, wherein generating the content for the electronic gaming session comprises generating a graphical representation of the story based on the text-based description of the story.

17. The method of claim 13, further comprising:

monitoring, by the processor of the gaming system, game status information for the electronic gaming session;

obtaining, by the processor of the gaming system, an updated narrative based on the model, the initial narrative, and the game status information for the electronic gaming session;

generating, by the processor of the gaming system, updated content for the electronic gaming session based on the updated narrative; and presenting, by the processor of the gaming system, the generated updated content for the electronic gaming session in the user interface for the gaming system.

18. The method of claim 17, further comprising saving, by the processor of the gaming system, saving the updated narrative in response to a request from a player of the electronic gaming session.

19. The method of claim 13, wherein the model is maintained by a game narrative modeling system and wherein obtaining the initial narrative for the gaming session comprises receiving the initial narrative from the narrative modeling system.

20. The method of claim 13, wherein the model is maintained by the gaming system and wherein obtaining the initial narrative for the gaming session comprises generating the initial narrative.

* * * * *